United States Patent [19]
Irvin et al.

[11] Patent Number: 5,192,543
[45] Date of Patent: Mar. 9, 1993

[54] HEATED DIE PLATE FOR MAKING EXTRUDED PASTA SHAPES

[75] Inventors: Scot A. Irvin, Baldwinsville; Carleton G. Merritt, Phoenix; Raymond G. Kowalski, Weedsport, all of N.Y.

[73] Assignee: Borden, Inc., Columbus, Ohio

[21] Appl. No.: 751,057

[22] Filed: Aug. 28, 1991

Related U.S. Application Data

[62] Division of Ser. No. 539,185, Jun. 18, 1990, Pat. No. 5,089,284.

[51] Int. Cl.$^5$ .................. B29C 47/86; B29C 47/94
[52] U.S. Cl. .................. 425/378.1; 425/464; 425/DIG. 13; 249/78; 249/111; 249/115; 249/134
[58] Field of Search .............. 426/516; 425/461, 463, 425/464, 462, DIG. 115, 378.1, 378.2, 379.1, DIG. 13; 249/115, 111, 78, 114.1, 134

[56] References Cited

U.S. PATENT DOCUMENTS

| | | | |
|---|---|---|---|
| 3,008,434 | 11/1961 | Maldari | 425/461 |
| 3,138,462 | 6/1964 | Katz et al. | 99/85 |
| 3,192,049 | 6/1965 | Kinsley | 99/85 |
| 3,484,251 | 12/1969 | Lawrence et al. | 99/85 |
| 3,727,308 | 4/1973 | Ross | 426/516 |
| 3,762,931 | 10/1973 | Craig et al. | 99/85 |
| 3,992,554 | 11/1976 | Blake | 426/557 |
| 4,044,165 | 8/1977 | Baumann | 426/557 |
| 4,072,459 | 2/1978 | Lambertus | 425/464 |
| 4,324,748 | 4/1982 | Hatakeyama et al. | 425/461 |
| 4,346,119 | 8/1982 | Braibanti | 426/451 |
| 4,384,842 | 5/1983 | Cavalli | 426/516 |
| 4,423,082 | 12/1983 | Bauernfeind et al. | 426/557 |
| 4,469,711 | 9/1984 | Seltzer | 426/557 |
| 4,495,214 | 1/1985 | Seltzer et al. | 426/557 |
| 4,539,214 | 9/1985 | Winter et al. | 426/557 |
| 4,540,592 | 9/1985 | Myer et al. | 426/557 |
| 4,568,550 | 2/1986 | Fulger et al. | 426/19 |
| 4,614,489 | 5/1986 | Juravic | 426/516 |
| 4,675,199 | 6/1987 | Hsu | 426/557 |
| 4,687,433 | 8/1987 | Ozaki et al. | 425/464 |
| 4,699,048 | 10/1987 | Pavan | 99/470 |

FOREIGN PATENT DOCUMENTS

| | | |
|---|---|---|
| 0084831 | 1/1983 | European Pat. Off. |
| 0272502 | 6/1988 | European Pat. Off. |

OTHER PUBLICATIONS

"Golden Grain Stir-N-Serv Macaroni and Cheese Dinner" package directions, Golden Grain Macaroni Co., 1983, GGMC.

*Primary Examiner*—Jay H. Woo
*Assistant Examiner*—Khanh P. Nguyen
*Attorney, Agent, or Firm*—Venable, Baetjer Howard & Civiletti

[57] ABSTRACT

An apparatus for forming extruded pasta shapes. The apparatus is a die plate having a plurality of orifices wherein the die plate is heated, e.g., to a temperature of at least about 130° F. (about 54° C.), and preferably about 160° F. (about 71° C.) A coating is provided on only a portion of the interior surface of each orifice such that heat transfer to the paste is substantially inhibited in a given orifice until the cross section of the orifice has reached its smallest value.

7 Claims, 1 Drawing Sheet

HEATED DIE PLATE FOR MAKING EXTRUDED PASTA SHAPES

This application is a division of U.S. Ser. No. 539,185, filed Jun. 18, 1990, now U.S. Pat. No. 5,089,284.

FIELD OF THE INVENTION

The present invention concerns a process and an extrusion die for making pasta by forming shaped alimentary pastes.

BACKGROUND OF THE INVENTION:

Pasta consumption is enjoying a rise in popularity for reasons of health, nutrition, convenience and economy. Home consumers and restauranteurs are therefore in need of a pasta product which is prepared in a very short amount of time without loss of palatability or flavor. Commercially available dry pasta takes 9 to 12 minutes to cook for optimal tenderness. Once cooked, the pasta tends to become sticky and to lose a desirable mouthfeel upon standing for any period of time.

Another trend in food products is microwavable foodstuffs, because of the great savings of time and waste for the consumer. It is known in the art to prepare microwave cooked pasta. For example, Golden Grain Macaroni Company markets a product which is cookable in warm water. Its package directions require placing pasta in warm water; microwaving to boiling; continued boiling for three minutes to absorb water; and flavoring with a cheese sauce. However, the boiled pasta suffers great starch loss and is only palatable when sauce is added to the boiled product to mask its gumminess and starchiness.

It is also known in the art to prepare an uncooked pasta product which is tolerant of an initial exposure to room temperature or colder water. This allows the pasta to be microwave cooked by adding non-boiling water, inasmuch as the pasta product is pretreated in such a way as to stabilize it against starch leaching when exposed to cold water. Specifically, such pasta, which is the subject of a U.S. patent application of Chawan et al., Ser. No. 225,211, filed Jul. 28, 1988, now abandoned and assigned to the assignee of the present invention, experiences a starch loss, after cooking, of less than about 7.0% by weight of the uncooked pasta.

A continuation-in-part of that application, U.S. Ser. No. 485,893, filed Feb. 28, 1990, issued as U.S. Pat. No. 5,063,072.

That application teaches that one way by which such cold water tolerant pasta may be prepared is to subject it, after shaping, to a high temperature treatment, i.e., at least about 180° F. (about 82° C.). Such treatment may be accomplished in any of a number of ways, including treatment in a dryer (e.g., a hot air, humidity controlled circulating oven), microwave oven, heated drum, infrared tunnel, dielectric heater, or by contact with superheated steam. Preferably, however, the high temperature treatment is performed using a tres haute temperature (THT) drier, such as the one disclosed in Pavan U.S. Pat. No. 4,699,048.

While such treated pasta has the desirable property of microwave cookability due to its cold water tolerance, its processing is undesirable in that it requires additional and expensive equipment, i.e., a drier capable of tres haute temperature drying. Such dryers may cost as much as one million to three million dollars.

It is also known, as in Katz et al., U.S. Pat. No. 3,138,462, to heat an entire pasta extruder to temperatures as high as 140° C. (about 284° F.). However, that patent is concerned with the extrusion of already cooked or gelatinized pasta, the heating probably being performed in order to avoid clogging of the die. Furthermore, this patent does not address the issues of cold water tolerance and microwave cookability.

It is further known in a pasta extrusion process, as U.S. patent application Ser. No. 39,744 to Ventres et al., filed Apr. 20, 1987, assigned to the assignee of the present invention, to heat the die head, or throat portion, of an extrusion die, upstream of the die plate to a temperature which approximates the temperature of the alimentary paste within the extruder. However, inasmuch as the heating takes place upstream of the paste-shaping die orifices, no effect is experienced by the already formed pasta shapes.

SUMMARY OF THE INVENTION

This invention is thus directed to a process and an extrusion die for preparing extruded pasta shapes which are, inter alia, capable of microwave cooking. More specifically, the invention pertains to a method using a heated extrusion die plate, and to an extrusion die plate which can be heated to a temperature of at least about 130° F. (about 54° C.).

In one embodiment, the invention is a method of forming extruded pasta shapes by feeding a feedstock comprised of glutinous flour and water to an extruder that is equipped with a die plate having a plurality of holes, and extruding said alimentary paste through the holes in the extruder die plate by internal pressure. Extrusion is performed in such a manner that the extruded pasta shapes remain substantially uncooked. The improvement provided by the invention comprises heating the extruder die plate to a temperature of at least about 130° F. (about 54° C.), and preferably about 160° F. (about 71° C.), in order to attain the advantages of the invention.

The invention further comprises a method of forming pasta shapes by feeding a feedstock comprised of glutinous flour and water to an extruder that is equipped with a die plate having a plurality of holes whose cross sections preferably decrease in the direction of extrusion. The alimentary paste is extruded through the holes in the extruder die plate in such a manner that the extruded alimentary paste remains substantially uncooked. The improvement provided by the invention comprises heating the die plate to a temperature of at least about 130° F. (about 54° C.) and preferably about 160° F. (about 71° C.), and preferably providing a coating on a portion of the interior of the holes through the die plate such that heat transfer to the paste being extruded is substantially inhibited until the cross section of the hole has been reduced, and preferably has reached its smallest value.

In other aspects, the invention is an extruder die plate which may be heated to the above described temperatures, and which may have a coating as above described. Preferably, the die plate is equipped with internal heaters to achieve the requisite heating, as described hereinafter.

In other preferred embodiments, the alimentary paste further contains between about 0.5 weight percent and about 10.0 weight percent of a low temperature coagulatable protein material, and the hole coating material is a plastic having a low coefficient of friction and low thermal conductivity, e.g., polytetrafluoroethylene or polyvinylidene fluoride.

In yet other aspects, the invention is extruded pasta shapes prepared using the die plate and method of the present invention.

BRIEF DESCRIPTION OF THE DRAWING FIGURES

DETAILED DESCRIPTION

Figure 2:
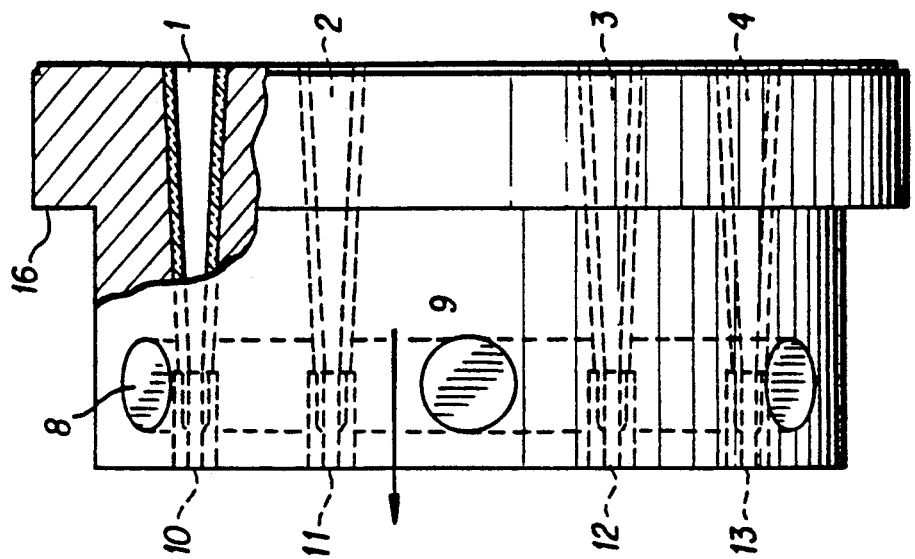
FIG. 2 is a schematic side elevation of the heated die plate, having a cut-away portion showing detail of a die orifice.

This invention pertains to economical and efficient processes for preparing an alimentary paste for shaping by extrusion into pasta shapes, which pasta is microwave cookable without substantial starch leaching.

The invention is, inter alia, a method of forming shaped alimentary pastes by feeding a feedstock comprised of glutinous flour and water to an extruder that is equipped with a die plate having a plurality of holes, and extruding said alimentary paste through the holes in the extruder die plate by internal pressure. Extrusion is performed in such a manner that the extruded alimentary paste remains substantially uncooked, i.e., less than about 20% of its starch content is gelatinized. The invention comprises heating the extruder die to a temperature of at least about 130° F. (about 54° C.) in order to attain the advantages of the invention.

Conventional pasta preparation is a fairly time-consuming process for the consumer, taking at least about fifteen minutes. Before the pasta encounters water in which it is to be cooked, the water must be at or near the boiling point in order to set gluten in the pasta and prevent leaching of the starch. The cooking process then typically requires about 9 to 12 minutes, after which the cooking water must be drained.

It is a surprising advantage of the present invention that it is possible to subject uncooked pasta to room temperature or colder water for a brief period of time, and subsequently cook the resulting pasta for a short period of time, e.g., by microwave energy, without substantial loss of starch into the water.

It has been found that when, in the course of extrusion, alimentary paste, which inherently contains protein in the form of gluten, is subjected to a temperature of at least about 130° F. (about 54° C.), the protein component which surrounds the starch granules, and which is water soluble in its native form, at least partially denatures, resulting in its effectively encapsulating the starch granules by forming a water insoluble protein matrix in which the starch is entrapped. This matrix renders the extruded pasta shape stable against starch leaching in the presence of cold water, at least for short periods of time. Conventional pasta that has not been subjected to this high temperature denaturation must immediately contact extremely hot (preferably boiling) water in order to set the protein matrix; otherwise, the starch will rapidly leach out into the cooking water, resulting in a mushy, gummy, unsatisfactory product.

The result in the present invention is a storage-stable, still uncooked extruded pasta shape which has the unique advantage of being able to withstand exposure to non-boiling water, without leaching starch into the water, for a period of at least about ten to about fifteen minutes. This confers to the pasta shape the property that it may be microwave cooked without first exposing it to boiling water. Thus, the actual cooking process may be accomplished in only about six to about ten minutes.

Uncooked pasta may be prepared from any formulation known in the art. By "uncooked" is meant pasta wherein a major portion, i.e., greater than about 80% by weight of the total starch content, is ungelatinized (i.e., less than about 20% gelatinization). The term "cooking" as used herein refers to the process of gelatinizing the starch and heating the pasta.

Pasta is prepared by shaping an "alimentary paste" or dough by which is meant a glutinous flour and water mixture. Alimentary pastes or doughs are generally made from coarse, hard flours obtained from hard wheat such as the middlings of durum wheat, often referred to as "semolina flour" or "semolina". In addition, fine flours such as durum flour, wherein 98 weight percent passes through a 70 mesh sieve, are also suitable and are intended to fall within the scope of the term "glutinous flour". The only requirement for the flour is that it provide a self supporting paste.

A typical alimentary paste used to prepare pastas suitable for the present invention comprises, based on the weight of uncooked pasta, between about 67.0% and 80.0% by weight (solids basis) of semolina flour (having an inherent moisture content of between about 10% and about 15% and preferably between about 11% and about 14% by weight, and a gluten content of between about 11% and about 14% by weight), the balance being optional additives and added water.

More specifically, then, a suitable paste may be prepared from 10 kg fancy durum patent flour and about 2200 grams of added water; a lower moisture formulation may be prepared by adding about 1500 grams of added water to the same amount of flour.

Several additives may be added to the flour/water alimentary pastes suitable for use in the present invention. Some suitable additives include glycerol monosterate (GMS); an added low temperature coagulatable protein material; a sulfhydryl reducing agent; and added vitamins typically added to enrich food products, e.g., B-vitamins. A suitable normal or lower moisture paste as described above might additionally include, e.g., 2.5 grams of cysteine.

In a preferred embodiment, a low temperature coagulatable protein material, distinct from the gluten component inherent in the glutinous flour, is added. These protein materials are ones which coagulate (i.e., denature) at temperatures of about 140° F. (about 60° C.) or above. The exact temperature at which the protein denatures is dependent on various factors including moisture content; higher moisture contents require lower temperatures to denature the protein material. The added protein may serve to enhance resistance to starch leaching in the present invention. Additionally, it may improve the texture and/or flavor of the product, such as when egg noodles are desired. The protein component, if used, must be denaturable at the temperature to which it will be exposed in the heated die of the present invention, in order to contribute to the benefits of the present invention.

The added proteins include, but are not limited to, albumin, whole egg, egg white, egg yolk, whey protein concentrate, and mixtures thereof. Any of these protein materials may be added dry or as is. A preferred protein material is egg white. When used, the added protein component comprises up to about 10.0% by weight of the total paste, i.e., between about 0.5% and about 10.0%, and preferably between about 0.5% and about 3.0% by weight based on the alimentary paste.

The remainder of the paste comprises water. Water is preferably introduced in the form of ice before or during extrusion, to prevent swelling of the paste during extrusion. The water, or moisture, content is preferably between about 20.0% and about 30.0% by weight of the paste. In this application, water or moisture content refers to total moisture, that is, inherent moisture, or moisture naturally present in the flour and other ingredients, as well as added water. The term "water" as used herein includes water in all physical states, i.e., steam, ice or liquid water, or mixtures thereof.

The flour, water and any additives used may be mixed in any way conventional in the art, such as by mixing in a vertical cutter mixer (e.g., a Hobart Cutter/Planetary Mixer) for approximately one minute, at which time the pasta dough is ready for extrusion in any of the conventional pasta shapes. Alternatively, the components of the paste may be separately introduced into an extruder without prior mixing. These extruded pasta shapes are then preferably subjected to a drying step, discussed below.

Shaped pasta is prepared from the paste by extrusion. Extrusion can be performed with any acceptable extruder whose die has been modified in accordance with the invention. The alimentary paste is fed into the extruder wherein it may, optionally, be blended, in the case of a screw-type extruder, or further blended, if the feedstock was premixed before being fed into the extruder, and then forced by internal pressure through the holes of the extruder that is equipped with a die plate having a plurality of holes to obtain the desired shape. The holes of the die plate have cross sections o which decrease, e.g., in stepwise fashion, in the direction of extrusion. The holes in the extruder die plate prescribe the profile of the extruded pasta shape. Such shapes include spaghetti, fettucine, linguine, rotini, elbows, spirals, shells, ziti, vermicelli, fusilli, tortellini, ravioli, manicotti, lasagne, rote, tortiglioni, or the like.

The alimentary paste may pass through the die plate due to internal pressure generated by a rotating screw or screws. Suitable screw speeds range from about 3.5 to 14 revolutions per minute (rpm), and preferably about 3.5 rpm to 10.5 rpm. A particularly optimal screw speed is about 3.5 rpm. In general, screw speeds in excess of about 14 rpm appear to result in compromised texture and increased starch loss in the pasta product, whereas screw speeds of less than about 3.5 rpm render the extrusion process economically unfeasible.

The screw speed is chosen to result in an extrusion rate, for example, in the range of about 50 grams per minute (g/min) to about 500 g/min or greater, preferably about 175 g/min, based on a six-orifice die having approximately two inch-deep orifices.

Optimized extrusion rate appears to be correlated to, inter alia, die plate temperature, barrel temperature and screw speed. For example, at a screw speed of 3.5 rpm and at barrel temperatures of 110° F. and 120° F., respectively, acceptable extrusion rates of 62 and 55 g/min, respectively, result. Whereas, at 110° F. and 10.5 rpm, an acceptable extrusion rate of 175 g/min occurs.

If the extrusion rate is significantly higher than the specified maxima, the texture of the product will suffer, due to excessive shear and gelatinization, and cooking loss will increase.

Vacuum pressure may or may not be used. If used, a pressure of about 40 cm Hg to about 60 cm Hg, preferably about 40 cm Hg, may be used.

One particular advantage of the present invention over prior art extrusion processes is the reduction in pressure on the die orifice required, and concomitant cost savings, of the present process. Whereas conventional processes may require, at a barrel temperature of about 110° F. (about 43° C.), at least about 4500 psi internal (die orifice) pressure, the present process may be performed satisfactorily at pressures in the range of about 2500 psi to 3000 psi at that temperature. This facilitation is most likely a result of a viscosity decrease of the heated extruded paste as it passes through the die plate.

Power savings relative to prior art extrusion processes are about 4% to 7%, based on amperage used. Typical power usage in the present invention is in the range of about 10 amps to about 15 amps, preferably about 12 amps to about 13 amps. However, power usage is, like other parameters, rate dependent; higher power use is related to higher extrusion rate.

Conventional extrusion processes typically require about 15 amps to about 20 amps; this reduction in power use results in a significant and unexpected cost savings relative to prior art processes.

Typical extruder conditions include a barrel temperature of about 70° F. to about 120° F. (about 21° C. to about 49° C.), preferably about 100° F. (about 38° C.) to about 120° F. (about 49° C.). A screw temperature in the same range is preferred. Preferably, a vacuum of 26 to 76 cm Hg is applied, and a die orifice pressure of 1500 psi to 3000 psi is used.

For optimal extrusion, the barrel temperature of the extruder should be approximately 120° F. (about 49° C.), and the extruder should have about 40 to about 60 cm of mercury vacuum; a power delivery of 5 to 10 amps; and a die orifice pressure of 1800 to 2700 psi.

Extruders which have been found acceptable include the DeMaco-S25 extruder, the Mapimipianti GF20 extruder and other commercially available extruders marketed by Brabender, Buhler or Braibanti.

It should be mentioned here that the present invention has been seen to permit decreased operating costs relative to the prior art due, inter alia, to decreased amperage requirements; this and other advantages will be discussed in further detail hereinbelow.

A suitable extrusion process is a so-called low moisture, high temperature process, i.e., one where the final moisture content of the resulting pasta is between about 20% and about 28% by weight, based on total moisture in the pasta. Such a process is disclosed in U.S. Ser. No. 39,744, to Ventres et al., filed Apr. 20, 1987, assigned to the assignee of the present invention. That application is herein incorporated by reference.

The present invention also pertains to an extrusion die plate for forming extruded pasta shapes which is modified to carry out the method of this invention.

The modification of the extrusion apparatus in accordance with this invention comprises a means for heating the die plate thereof. The die plate may be modified in any practical manner such that it may be heated to a temperature of at least about 130° F. (about 54° C.), e.g., in the range of about 130° F. (about 54° C.) to about 200° F. (about 93° C.) and preferably about 140° F. (about 60° C.) to about 180° F. (about 82° C.), preferably by means of integral heating means, e.g., thermostatically controlled electrical resistance heaters. More preferably, the die plate has a temperature in the range of about 150° F. (about 66° C.) to about 160° F. (about 71° C.), e.g., about 160° F. (about 71° C.). In general, at higher screw speeds/higher extrusion rates, a higher die plate temperature (i.e., about 180° F. or about 82° C.) is still very acceptable.

Although the extruded pasta is exposed to heat, the heating is of short enough duration that the extruded pasta remains substantially uncooked such that less than about 20% of its starch content is gelatinized. This parameter is important inasmuch as best quality pasta, in terms of texture and shelf life, results when the pasta's starch is ungelatinized yet encompassed in a protein matrix.

This heating may be achieved, for example, by providing the die plate with one to six core heaters, preferably six, of about 100 to about 400 watts each, e.g., about 400 watts each, the temperature of which may be controlled with a setpoint thermostat. Alternatively, each profile may be heated individually by supplying heat to each hole, e.g., through resistance wires.

Figure 1:
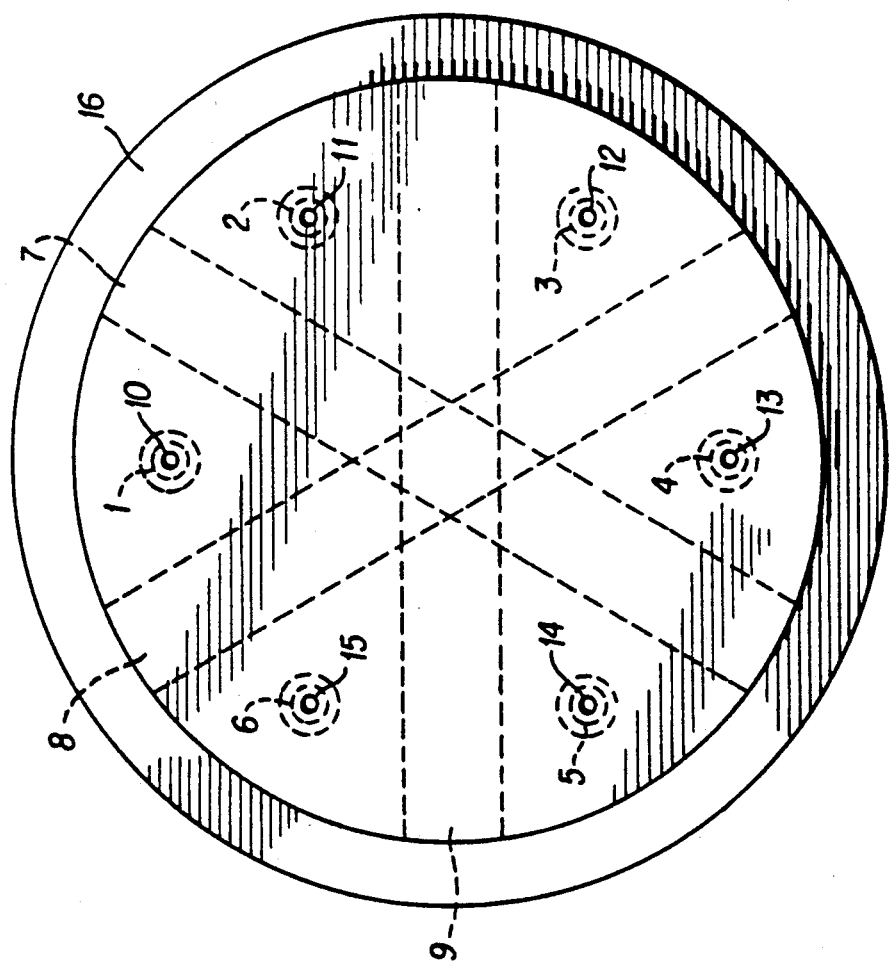
FIG. 1 is a schematic end view of the heated die plate of the invention, showing means for heating.

Turning to FIG. 1, a schematic end view of the outer face of the die plate with integral heating means is shown. Uncooked alimentary paste passes through die orifices 1–6 (shown in phantom in FIG. 1 as two concentric circles to indicate the progressively decreasing diameter of the orifices in the direction of extrusion) during which time it is exposed to heat supplied by core heaters 7–9, heated by resistance heaters, not shown. Numerals 10–15 indicate the end portions of orifices 1–6, showing that the diameter of the orifices decreases in the direction of extrusion. Collar 16 secures the die plate to the extruder.

The heating of the die plate, of course, results in an increased temperature of the extruded alimentary paste. Looked at in another way, the apparatus is modified so as to produce an alimentary paste which, when extruded through the die plate, has an average temperature in the range of about 120° F. (about 49° C.) to about 165° F. (about 74° C.) and preferably about 130° F. (about 54° C.) to about 150° F. (about 66° C.), e.g., about 140° F. (about 60° C.). In general, die plate temperature and screw speeds may be varied so long as the average product temperature does not rise above about 165° F. (about 74° C.).

The optimal temperature range for either the die plate or the paste depends on other processing parameters such as extrusion rate, pressure, moisture content, etc. For example, it has been observed that, as screw speeds are increased, higher die temperatures are tolerable and even preferable.

The die plate comprises a number of die orifices (holes) through which the pasta is extruded. Preferably, the die orifices are tapered, such that their cross sections decrease (e.g., from about 0.25 in. to about 0.063 in.) in the direction of extrusion. In one embodiment, the cross section decreases in one or more step-down sections.

In a particularly preferred embodiment, at least a portion of the holes of the die orifice are lined with a stick-resistant surface, having a low coefficient of friction and low thermal conductivity, e.g. a coating material selected from polyvinylidene fluoride and polytetrafluroethylene. A particularly preferred coating material comprises polytetrafluoroethylene ("TEFLON", from DuPont, Wilmington, Delaware). The innermost face of the die plate is also preferably insulated in order to prevent transfer of heat to the unextruded paste.

The coating on a portion of the orifices serves to substantially inhibit heat transfer to the paste being extruded until the cross section of the hole reaches its smallest value, e.g., by coating all but about the last 10% to 25% of the orifices, e.g., the last ¼ inch of the orifices, which appears to be beneficial to the process for the reason discussed below.

FIG. 2, which depicts a side view of the die plate, shows, in the cut-away section, the embodiment wherein all but the last portion of the die orifice is coated. The arrow indicates direction of extrusion. Die orifices 1–4 have progressively smaller cross sections in the direction of extrusion. The cross hatched portion shown in the cut-away represents a thin (e.g., 0.04") plating of coating material such as polyvinylidene fluoride which coats all but the portion of the orifice of smallest cross-section. These uncoated end portions 10–13 are the portions wherein heating of the paste actually occurs.

It has been observed that optimal properties result when as little as possible of the extruded product (i.e., 20% by weight or less) is gelatinized. This is what is generally meant by the description, "substantially uncooked." Thus, best results are obtained if the smallest practicable volume of the pasta shape, i.e., if only the outermost "shell" of the pasta, is gelatinized. While not wanting to be bound by any particular theory, it appears that an optimized product results if the matrix of the paste is allowed to continue mixing for the longest possible period of time; this preferred embodiment allows this to happen by delaying surface gelatinization and the subsequent formation of a hard outer "corona" or shell until effectively the last possible moment.

Although FIG. 2 shows the cross section decreasing in a continuous fashion, the cross section of the die orifices may decrease from the back to the front of the die plate in several step down sections. As the paste passes through these sections, it has a tendency to fold over itself so that the paste which is heated from contact with the wall of the die orifice would be folded into the center of the pasta.

By coating most of the interior of the orifice, the paste being extruded has direct thermal contact with the heated die plate only in the last section of the die orifice which has the smallest (final) cross section, thus helping to restrict gelatinization to this outermost "corona" region of the shape. By acting as a partial thermal insulator, the coating substantially inhibits heat transfer to the paste within the coated section of the bore until the cross section of the hole has reached its smallest value, thus exposing the paste to the higher temperature only in the last section of the hole. This apparently serves to partially gelatinize the outer portion of the shaped pasta without gelatinizing the core, to obtain the desired result of minimal, i.e., less than about 20%, gelatinization.

The extruded pasta shapes may, optionally, be cut to desired lengths to provide a product in substantially final form. Cutting generally occurs at the extruder die and may be carried out in a conventional manner. Cutting is not essential to the practice of this invention since the pasta shape may be formed into desired lengths by merely pulling the extrudate away from the die.

The shaped and cut pasta may then be subjected to a drying step, as known in the art, to lower its moisture content from between about 20% and about 30% by weight down to between about 10% and about 15%, and preferably between about 11% and about 14%, based on the weight of the dried pasta. Traditionally, pasta is dried at a temperature of about 110° F. (about 43° C.) dry bulb, and about 100° F. (about 38° C.) wet bulb, for about 14 to about 36 hours.

The resulting pasta may then be packaged, preferably in packaging which is shelf stable, in any way known in the art, but preferably in packaging which is microwave safe and penetrable so that the pasta may be prepared directly in its package. Such packaging includes paper (e.g. cardboard), glass or plastic. The packaging may comprise individual portions (e.g., of 3 to 4 ounces each) or bulk portions (e.g., of 5 to 10 pounds) for institutional use. By shelf stable is meant that the packaging protects its contents from degradation under non-refrigerated conditions, i.e., above 40° F. (about 4° C.), for a time period of up to about 36 months' time.

Such microwave cookable prepackaged product may be prepared for consumption by adding non-boiling water or other liquid, e.g., hot tap water, directly to the package itself. The amount of added water should be sufficient to hydrate the pasta but preferably small enough that, after cooking, all of the liquid is absorbed into the product so that draining of excess water is not necessary.

Microwave cooking then may be accomplished by microwave heating at a power level of about 600 to about 750 watts, for a period of time from about eight to about ten minutes.

Several unexpected results follow from the aforedescribed method, in addition to the aforedescribed objective, i.e., rendering the pasta amenable to various processing conditions such as microwave cooking.

Significantly, from an economic standpoint, it has been discovered that it is possible to increase the production rate and to decrease extrusion head pressures, relative to prior art processes, by employing the heated die plate of the present invention. Also, decreased amperages may be used with the increased die plate temperatures; these phenomena are probably the result of a slight decrease in viscosity due to the addition of heat, thus facilitating extrusion to some degree.

Also very significant are the quality characteristics of the shaped alimentary pastes which result, even at the aforedescribed reduced extrusion pressures and power usage of the invention. The extruded pasta shapes prepared using the aforedescribed die and method are also part of the present invention.

It has surprisingly been found that cooking losses from pasta products prepared using the heated die plate of the present invention are less than about 8%, and preferably less than about 7% by weight. These starch losses are comparable to those experienced by the more capital intensive processes disclosed in the 10 aforedescribed United States patent application Ser. No. 225,211 of Chawan et al., which require expensive apparatus such as a tres haute temperature drier, in order to accomplish the requisite heating.

Moreover, there is an apparent improvement in the color of the cooked product relative to conventionally extruded pasta. Specifically, a brighter yellow color was observed with increased die plate temperature, which was deemed desirable. This was probably a result of the starch gelatinization at the surface which had occurred.

Additionally, the texture of the extruded product appears to improve with increased die plate temperature. This is probably an indirect result of the lower retention time effected by the heating. The lowered retention time results in faster production time, resulting in less starch damage during processing.

Product texture may be further improved by insulating the die plate, as described above, so that heating only occurs as the alimentary paste crosses the narrowest cross section of the die orifice.

The following Examples are provided to further illustrate the invention. In these Examples and throughout the specification, all temperatures are expressed in degrees Fahrenheit and each value is accompanied by an approximation of such value in degrees Celsius. In addition, all percentages are by weight, unless expressly indicated to be otherwise.

EXAMPLE 1

An alimentary paste was made up using $SO_2$ treated semolina flour combined with water using a Hobart vertical cutter to make a paste having a total moisture content of 26%.

A Mapimipianti GF20 extruder was used, which had a die plate having tapered die orifices, as depicted in FIGS. 1 and 2. The die plate was modified for heating by modifying a conventional die plate as follows. First, all holes of a twelve-orifice die were plugged, and six of the holes redrilled with a 0.03 inch drill to make the six die orifices. 0.50 inch holes were drilled for accommodating resistance heaters. The inner face and orifices were then plated with polyvinylidene fluoride, and the ends drilled out with a 0.03 inch drill. The die orifices were 2.063 inches deep, the last 0.25 inches of which were uninsulated, the remainder being insulated with polyvinylidene fluoride. The inside radius of the tapered die orifices decreased from 0.22 ins. to 0.03 ins. at its end.

In this Example, the temperature of the extruder barrel was controlled at 110° F. (about 43° C.). The screw speed was controlled at 3.5 rpm. The resulting extrusion pressure was 4290 psi, and the power was 15.25 amps. An extrusion rate of 41 g/min. was observed.

A thermostat controlling the heaters in the die plate was set at 140° F. (about 60° C.) to attain an actual temperature of 134° F. (about 57° C.). These temperatures were measured using an infrared thermometer between the die surface center and the outside of the extruded strand.

Product temperature was measured to be 135° F. (about 57° C.), using a polyvinylchloride (PVC) elbow to collect a sample of extrudate, and measuring the temperature of the sample collected.

A retention time of 0.18 seconds was calculated for the uninsulated portion of the die, and of 1.45 seconds for the entire die. Retention time was measured by collecting a length of extrudate extruded in one minute, measuring the mean length in inches ÷ 60 seconds, and solving for $D = V \times t$, where D = length of either the uninsulated section (0.25 in), or of the total die (2.063 in.)

The resulting pasta shape was dried while cycling the dry bulb temperature from 40° C. to 57° C. to 25° C. and cycling the relative humidity from 50% to 77% to 50%.

The resulting pasta shape (thin spaghetti) was cooked by the following method: 50.0 grams of pasta was added to a four-quart saucepan containing 1500 grams of boiling distilled water, 15 seconds after the water came to a boil. Fifteen seconds later, after all contents had come to a boil, a 12 minute timer was set. After 12 minutes, the pasta was removed from the heat, drained and allowed to sit for one minute before evaluation.

A texture rating of 4.0, on a scale of 1.0 to 5.0, was assigned to the cooked product, indicating very good texture. (In the texture rating scale, 1.0 indicates poor texture, 3.0 indicates acceptable texture, 4.0 indicates very good texture, and 5.0 indicates excellent texture.) A percentage starch loss of 6.2% was measured, by dividing the product of the percent solids in the drain water times drain water weight, by the initial weight of the uncooked pasta.

EXAMPLES 2-3

The process of Example 1 was essentially repeated, except that the temperature setting for the thermostat controlling the die plate was increased to 160° F. (about 71° C.) in Example 2 and to 180° F. (about 82° C.) in Example 3, to attain actual temperatures of 148° F. (about 64° C.) in Example 2 and of 158° F. (about 70° C.) in Example 3. The barrel temperature was again 110° F. (about 43° C.). In both Examples 2 and 3, the extrusion pressure was 3725 psi.

The product temperatures were measured to be 136° F. (about 58° C.) in Example 2, and 144° F. (about 62° C.) in Example 3. Extrusion rates of 48 g/min and 61 g/min were employed for Examples 2 and 3, respectively.

Die retention times of 0.14 seconds for the uninsulated portion of the die, and of 1.17 seconds for the whole die were measured in Example 2; and of 0.11 seconds and 0.92 seconds in Example 3.

The extruded product, after drying and cooking had, in both cases, a texture rating of 3.5, indicating acceptable texture, and percentage starch loss of 7.4% (Example 2) and 7.5% (Example 3).

EXAMPLES 4-6

Again, the process of Example 1 was substantially repeated, except that the barrel temperature setting was increased to 120° F. (about 49° C.) for each of Examples 4-6. After increasing the barrel temperature setting, the extruder was allowed to equilibrate for 40 minutes.

Power, extrusion pressures, and die (plate) temperature thermostat settings were varied in each of Examples 4-6. These values are summarized below:

|  | Example 4 | Example 5 | Example 6 |
|---|---|---|---|
| Power (amps) | 12.25 | 13.25 | 12.75 |
| extrusion pressure (psi) | 3775 | 3290 | 3025 |
| die temperature setting | 140° F. (60° C.) | 160° F. (71° C.) | 180° F. (82° C.) |
| actual die temperature | 140° F. (60° C.) | 155° F. (68° C.) | 168° F. (76° C.) |

Product temperatures were measured to be 132° F. (about 56° C.); 143° F. (about 62° C.); and 153° F. (about 67° C.), respectively, and extrusion rates, 37 g/min; 51 g/min; and 57 g/min; respectively, for Examples 4-6. Die retention times were measured, for the uninsulated portion and for the whole die, to be 0.20 seconds and 1.61 seconds for Example 4; 0.13 seconds and 1.05 seconds for Example 5; and 0.12 and 0.98 seconds for Example 6.

The extruded products had texture ratings of 3.0; 3.5; and 3.0, respectively, and percentage starch losses of 6.8%; 7.7%; and 7.4%, respectively, for Examples 4, 5 and 6.

EXAMPLE 7

The process of Example 1 was followed, except that, inter alia, the screw speed was increased to 10.5 rpm, and the barrel temperature, to 120° F. (about 49° C.). Power of 15.5 amps; an extrusion pressure of 3825 psi; and an extrusion rate of 175 g/min were recorded.

The die thermostat temperature was set at 200° F. (about 93° C.) to attain an actual temperature of 177° F. (about 81° C.), and the product temperature was measured as 160° F. (about 71° C.).

Die retention time was 0.05 seconds in the uninsulated portion of the die and 0.38 seconds for the entire die.

The extruded product had a texture rating of 3.0 and a starch loss of 6.9%.

EXAMPLE 8

This Example shows that deleterious effects regarding starch loss ensue when the temperature of the heated die plate is below the temperature range claimed in the present invention.

The procedure of Example 1 was substantially repeated, except that the die temperature thermostat was set at 120° F. (about 49° C.), to attain an actual die temperature of 126° C. (about 52° F.).

Power was measured at 16.25 amps, extrusion pressure at 5700 psi, and extrusion rate at 32 g/min.

The temperature of the extruded product was measured at 124° C. (about 51° C.), and the die retention times as 0.23 seconds (uninsulated portion) and 1.89 seconds (entire die).

The product had a texture rating of only 2.5, indicating fair textural properties, and an unacceptably high starch loss of 10.9% by weight.

EXAMPLE 9

Like Example 8, this Example shows the deleterious effects of low die plate temperature.

Similar to Example 5, in this Example, a screw speed of 3.5 rpm; barrel temperature of 120° F. (about 49° C.); and power of 13.25 amps were used. The extrusion pressure was 4490 psi, and the extrusion rate was 24 g/min. The die thermostat was set at 120° F. (about 49° C.) (actual 122° F., or about 50° C.) and the product temperature was also 122° F. (about 50° C.). Retention times were 0.28 seconds (uninsulated) and 2.34 seconds (entire).

The extruded product had a texture rating of only 2.5 and a starch loss of 8.9%.

EXAMPLE 10

This Example shows that, at higher extrusion rates, higher die plate temperatures produced an acceptable or nearly acceptable product.

The procedure of Example 8 was repeated except that the die plate temperature was set at 200° F. (about 93° C.) to attain an actual die temperature of 186° F. (about 86° C.). Power was 15.0 amps; extrusion pressure, 2975 psi; and extrusion rate, 65 g/min. The extruded product had a temperature of 154° F. (about 68° C.), and die retention times were measured as 0.10 seconds (uninsulated) and 0.85 seconds (entire). The resulting product had a acceptable texture rating of 3.5, and an only slightly high starch loss of 8.2%.

EXAMPLES 11 AND 12

The following Examples show that, at higher extrusion rates, high die plate temperatures are acceptable.

Again, the process of Example 1 was essentially followed, except that, in Example 12, a screw speed of 6.25 rpm was used, and, in both of these Examples, a die temperature setting of 200° F. (about 93° C.) was used, to attain an actual die temperature of 190° F. (about 88° C.) in Example 11, and of 182° F. (about 83° C.) in Example 12.

In Example 11, the power used was 12.75 amps; the extrusion pressure was 2675 psi; and the extrusion rate was 65 g/min. In Example 12, these values were 14.5 amps; 3275 psi; and 109 g/min, respectively. (The extrusion rate in Example 12 was about 1.7 times that of Example 11.)

Retention times were 0.10 seconds (uninsulated) and 0.85 seconds (entire) in Example 11, and 0.06 seconds (uninsulated) and 0.52 seconds (entire) in Example 12. Product temperatures of 163° F. (about 73° C.) and of 156° F. (about 69° C.), were measured in Examples 11 and 12, respectively.

The product of Example 11 had a textural rating of 2.5 and a starch loss of 9.7%. The product of Example 12 (wherein the die temperature was actually only about 182° F.) had a textural rating of 3.0 and a starch loss of 8.2%.

EXAMPLES 13-21

The following Examples were conducted to show the effects on product texture and cooking loss of varying the screw speeds along with temperature.

In each of Examples 13-21, mix moisture was 26%, the barrel temperature was 120° F. (about 49° C.), and drying was achieved as in Example 1.

Screw speeds; power; extrusion pressure and rate; extrudate velocity; die plate temperatures (settings and actual); product temperatures; texture rating; and cooking losses and listed for each of Examples 13-21 in the Table which follows.

EXAMPLES 22, 23 and 24

Three samples, resulting from Examples 14, 17 and 20 above, were tested for microwave cookability.

In Example 22, 123 grams of the product of Example 14 were added to 2 cups of hot water. The mixture was cooked for 12 minutes at the high setting, stirring 5 and 10 minutes into the cooking process. An acceptable product resulted, although, without draining, the product had excess water.

In Example 23, 123 grams of the product of Example 17 were added to 1½ cups of hot water, which mixture was cooked for 10 minutes on high, stirring 5 minutes into the cooking process. The product was acceptable, although slightly sticky, indicating too little water had been used.

In Example 24, 123 grams of the product Example 20, 1¾ cup hot water, and one teaspoon of sunflower oil were subjected to the same cooking process as in Example 23. The product which resulted was very acceptable.

CONCLUSIONS

The present invention thus provides a method and an extrusion die plate capable of preparing extruded pasta products which are microwave cookable in non-boiling water. Unlike other processes for producing cold water tolerant pasta shapes, the present process is relatively much more economical in terms of time and cost effectiveness; existing extrusion apparatuses may be easily modified in accordance with the present invention.

In addition to desirably low starch losses after exposure to non-boiling water, the process and extrusion die plate of this invention confer other desirable properties on the pasta so produced, including superior color and texture. Also, the process of the invention is accomplished at lower extrusion head pressures; higher production rates (at given power use levels); and decreased power use, all relative to prior art processes. Each of these factors adds to the economy of the claimed process relative to the prior art.

| Ex. # | Screw speed (rpm) | Power (amps) | Extrusion pressure (psi) | Extrusion rate (g/min) | Die setting °F. | Actual Die temp., °F. | Prod. temp., °F. | Extrudate Velocity, ft./min. | Texture | % Starch loss |
|---|---|---|---|---|---|---|---|---|---|---|
| 13 | 6.25 | 13-14 | 3375 | 135 | 160 (71° C.) | 158 (70° C.) | 139 (59° C.) | 11.5 | 3.0 | 8.2 |
| 14 | 10.5 | 13-14 | 4125 | 195 | 160 (71° C.) | 146 (63° C.) | 140 (60° C.) | 16.8 | 3.0 | 8.2 |
| 15 | 14.0 | 13-14 | 4500 | 295 | 160 (71° C.) | 153 (67° C.) | 148 (64° C.) | 25.0 | 3.5 | 8.8 |
| 16 | 6.25 | 12-13 | 3000 | 170 | 180 (82° C.) | 168 (76° C.) | 149 (65° C.) | 15.3 | 3.0 | 8.6 |
| 17 | 10.5 | 14-15 | 3800 | 245 | 180 (82° C.) | 172 (78° C.) | 149 (65° C.) | 19.3 | 3.0 | 8.1 |
| 18 | 14.0 | 14-15 | 3825 | 345 | 180 (82° C.) | 171 (77° C.) | 153 (67° C.) | 28.7 | 3.5 | 8.3 |
| 19 | 6.25 | 10-12 | 2750 | 180 | 200 (93° C.) | 186 (86° C.) | 160 (71° C.) | 18.0 | 3.0+ | 9.5 |
| 20 | 10.5 | 12.5-14 | 3300 | 270 | 200 (93° C.) | 188 (87° C.) | 156 (69° C.) | 26.5 | 3.5 | 8.1 |
| 21 | 14.0 | 13-14 | 3675 | 390 | 200 (93° C.) | 189 (87° C.) | 159 (71° C.) | 34.5 | 3.5+ | 8.0 |

These data appear to show that, at higher screw speeds, higher die plate temperatures are feasible and are not particularly deleterious to the product in terms of texture and starch loss.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. An extrusion die plate for forming shaped alimentary pastes, said plate being formed with a plurality of orifices, each defined respectively by a surface;

wherein said die plate comprises means for heating said plate;

wherein a portion of said surface of each of said orifices of said die plate has a coating thereon and wherein another portion of said surface of each of said orifices is uncoated, such that heat transfer to a paste being extruded through said orifices is substantially inhibited within said portion of said surfaces of each said orifices having the coating and heating of said paste occurs substantially only in the uncoated portion of said surface of each of said orifices.

2. An extrusion die plate according to claim 1 wherein said orifices have progressively smaller cross sections in the direction of extrusion.

3. An extrusion die plate according to claim 1 wherein heat transfer to a paste being extruded is substantially inhibited until the cross section of the orifices has reached its smallest value.

4. An extrusion die plate according to claim 1 wherein said coating is disposed on all but about the last 10% to 25% of the surface of each of said orifices in the direction of extrusion.

5. An extrusion die plate according to claim 1 wherein said die is heated by means of electrical resistance heating.

6. An extrusion die plate according to claim 1 wherein the orifice coating material is a plastic material having a low coefficient of friction and low thermal conductivity.

7. An extrusion die plate according to claim 6 wherein said coating material is selected from the group consisting of polytetrafluoroethylene, polyvinylidenefluoride, and mixtures thereof.

* * * * *